Aug. 23, 1949.        A. G. DANIELSON            2,480,002
                         LAWN TRIMMER
                      Filed Aug. 6, 1945
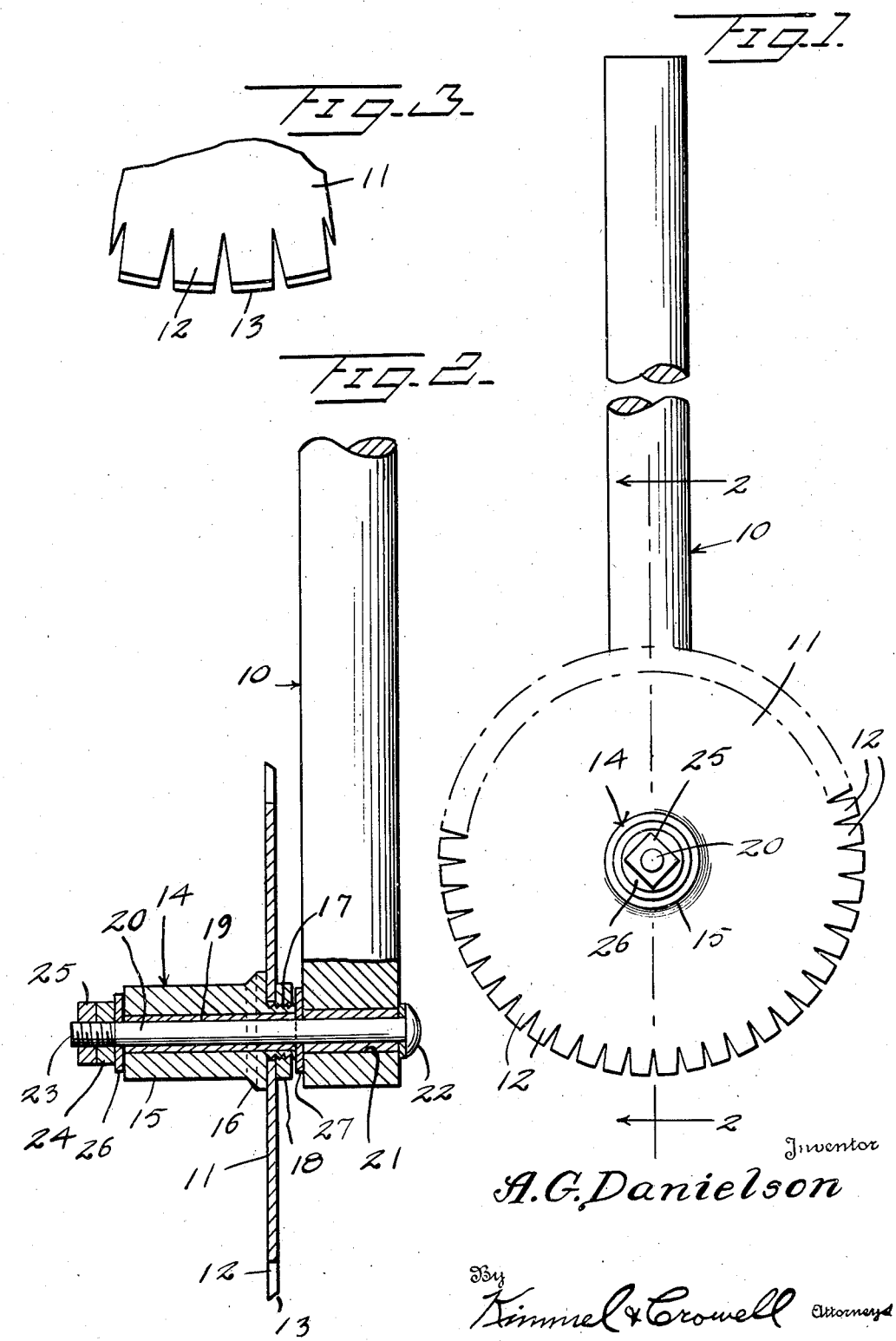
Inventor
A. G. Danielson
By Kimmel & Crowell  Attorneys Patented Aug. 23, 1949

2,480,002

UNITED STATES PATENT OFFICE 2,480,002

LAWN TRIMMER

Arvid G. Danielson, Minneapolis, Minn.

Application August 6, 1945, Serial No. 609,092

1 Claim. (Cl. 30—292)

This invention relates to lawn trimmers.

An object of this invention is to provide a lawn trimmer for trimming the edges of a law particularly about the edges of walks, the device including a handle, a cutting wheel and a guiding roller engageable with an edge of the walk, the roller effecting rotation of the cutting wheel.

Another object of this invention is to provide a lawn trimmer of this kind wherein the cutting wheel is formed with truncated teeth for cutting the roots of grass or weeds, and the roller being formed with a flange or rib adjacent the cutter for holding the latter against contact with the walk.

To the foregoing objects, and others which may hereinafter more fully appear, the invention consists of the novel construction, combination and arrangement of parts, as will be more specifically referred to and illustrated in the accompanying drawings, but it is to be understood that changes, variations and modifications may be resorted to which fall within the scope of the invention as claimed.

In the drawing:

Figure 1 is a detail side elevation partly broken away of a lawn trimmer constructed according to an embodiment of this invention, Figure 2 is a fragmentary sectional view taken on the line 2—2 of Figure 1, and Figure 3 is a fragmentary side elevation of the cutting wheel.

Referring to the drawing, the numeral 10 designates generally an elongated handle which has mounted on the lower or forward end thereof a lawn trimming wheel as will be hereinafter described. A disk-shaped wheel 11 is disposed at the forward end of the handle 10 and is provided with a plurality of wedge-shaped teeth 12 having keen outer edges 13. The wheel 11 is disposed at the inner end of a roller or wheel rotating member generally designated as 14. The roller 14 comprises an annular body 15 which is formed with a flange or annular rib 16 at its inner end. The body 15 is also formed with an externally threaded stud 17 extending from the inner end thereof on which the wheel 11 is mounted.

A nut 18 is threaded on the stud 17 and is adapted to tightly bind the wheel 15 with respect to the body 15. The body 15 has mounted therein a bearing sleeve 19 which extends through the stud 17 and within which a bolt or stationary shaft 20 is mounted. The bolt or shaft 20 is extended, as at 21, through the lower end of the handle 10 being provided with a head 22 which bears against one side of the handle 10. The opposite end of the shaft or bolt 20 is threaded, as indicated at 23, and a nut 24 is threaded on the bolt or shaft 23 and is locked by means of a lock nut 25. A washer 26 is interposed between the nut 24 and the adjacent end of the roller body 15 and a second washer 27 is interposed between the inner end of the stud 17 and the adjacent side of the handle 10.

In the use and operation of this trimmer, the roller 14 is adapted to be moved over the upper surface of a walk or other flat surface. The wheel 11 is adapted to be extended into the ground below the upper surface of the walk and the rib or flange 16 is engageable with the edge of the walk for holding the wheel 11 in slightly spaced relation with respect to the edge of the walk. The device is then pushed over the walk with the roller 14 forming the driving means for rotating the wheel 11, so that the wheel 11 will rotate with the roller. As the wheel 11 rotates, the teeth 12 thereon will cut any roots of grass, weeds or the like which may be disposed adjacent the edge of the walk and also cut any grass or weeds which may overlie the edge of the walk. This device is of simple construction so that it can be manufactured at low cost and will not readily get out of order. The teeth 12 of the cutting wheel may be sharpened, as indicated at 13, so as to provide a keen cutting edge which will cut any overlying grass, plants or the like and will also cut any roots which may be engaged by the wheel as the latter is moved along the edge of the walk.

The exact configuration illustrated is regarded as the optimum, but some of the desirable results inherent in this disclosure may be obtained by various slight modifications including some departure from the exact configuration shown, and it is therefore requested that the scope of the invention should be regarded as limited only by the terms of the claim.

What I claim is:

A lawn trimmer comprising an elongated handle, a shaft extending right angularly from one end of said handle, a roller rotatably mounted on said shaft, an annular flange carried by said roller at the inner end thereof, said flange formed with a downwardly and outwardly tapered side, a threaded stud extending from the inner end of said roller, and a cutting wheel on said stud.

ARVID G. DANIELSON.

REFERENCES CITED

The following references are of record in the file of this patent:

UNITED STATES PATENTS

| Number | Name | Date |
|---|---|---|
| 128,021 | Cook | June 18, 1872 |
| 1,660,177 | Reppe | Feb. 21, 1928 |
| 1,964,366 | Schwarz | June 26, 1934 |
| 2,295,317 | Young | Sept. 8, 1942 |